INVENTORS
CARL F. CARLZEN
ROBERT W. HELDA
WILLIAM L. LEHNER
BY Robert E. Strauss
ATTORNEY INVENTORS
CARL F. CARLZEN
ROBERT W. HELDA
WILLIAM L. LEHNER
BY Robert E. Strauss
ATTORNEY March 19, 1963 C. F. CARLZEN ET AL 3,081,885

ASSEMBLY APPARATUS

Filed Oct. 24, 1956 4 Sheets-Sheet 3

*INVENTORS*
CARL F. CARLZEN
ROBERT W. HELDA
WILLIAM L. LEHNER

*BY* Robert E. Strausser

*ATTORNEY*

INVENTORS
CARL F. CARLZEN
ROBERT W. HELDA
WILLIAM L. LEHNER
BY
Robert E. Strauss
ATTORNEY United States Patent Office 3,081,885
Patented Mar. 19, 1963

3,081,885

ASSEMBLY APPARATUS

Carl F. Carlzen, Buffalo, Robert W. Heida, Cheektawaga, and William L. Lehner, Snyder, N.Y., assignors, by mesne assignments, to Sylvania Electric Products Inc., Wilmington, Del., a corporation of Delaware Filed Oct. 24, 1956, Ser. No. 618,011
6 Claims. (Cl. 214—1)

This invention relates to automatic assembly apparatus, and more particularly to apparatus for placing electrical components upon electrical circuit panels at prescribed locations, and the invention has for an object the provision of a simple, reliable and automatic apparatus of this type.

The mechanization of factories and particularly the mechanization of production lines, which presently require the performance of numerous and precise manual operations, has recently become of increasing importance because of the necessity of reducing cost while providing an ever-improving quality, and numerous proposals have been submitted to effectively produce automatic machinery for mechanizing such production lines. This mechanization is particularly evident in the industry which is employed in the manufacture of electronic apparatus such as radio and television receivers in which a large number of components such as resistors, condensers, tube sockets, inductances, connectors, couplates and the like must be assembled on an electrical circuit chassis panel in the desired circuit relationships.

In most electronic apparatus, a considerable number of the electrical components employed in the circuit are formed with a disc-like body portion having leads extending laterally therefrom which are adapted to be electrically connected to appropriate conductors. One example of an electrical component of this type is the ceramic disc capacitor. Numerous problems arise in connection with the method of and means for manipulating components shaped in this manner so as to insure a secure electrical connection of the leads to the chassis panel and to insure correct positioning of these components so that they are supported in suitable positions and in suitable circuit relationships.

In view of the improvements in the art of fabricating chassis panels of the printed circuit type, it has been found advantageous to form the circuit conductors upon one side of an insulating panel and to mount the electrical components upon the opposite side with appropriate connecting leads extending therefrom through the panel for electrical connections with the printed circuit.

A further object of the invention, therefore, is the placement of electrical components upon a suitable chassis panel with the conducting leads of the components extending through the panel at the desired locations so as to permit proper electrical connection of the components in the circuit, and to secure the components to the panel.

Additional problems are encountered in devising a means for accurately feeding the components to the panel so that a component is available at the proper machine position for each cycle of machine operation. Accordingly, a still further object of the invention is the provision of a component feed mechanism or dispenser which operates in accordance with the above described requirements.

It is often necessary during the fabrication of a circuit chassis panel to mount a large number of components upon a small panel area. Accordingly, these components are very often closely spaced and it is advantageous to have some means for orienting the components and for moving them to their proper position without interfering with previously mounted adjacent components.

It is a further object of the invention, therefore, to position and secure an electrical component upon an area of the panel which is bordered by closely spaced previously mounted electrical components.

The foregoing objects are achieved in one aspect of the invention by the provision of an apparatus having chuck means for receiving the electrical components from a dispenser. A reciprocating component transfer device having clutching jaws moves longitudinally through the chuck to grasp the component and move it to the chassis panel. The apparatus is also provided with means for causing the various parts to be actuated for operation in the proper sequence.

For a better understanding of the invention, reference is made to the following description taken in conjunction with the accompanying drawings in which.

Figure 1:
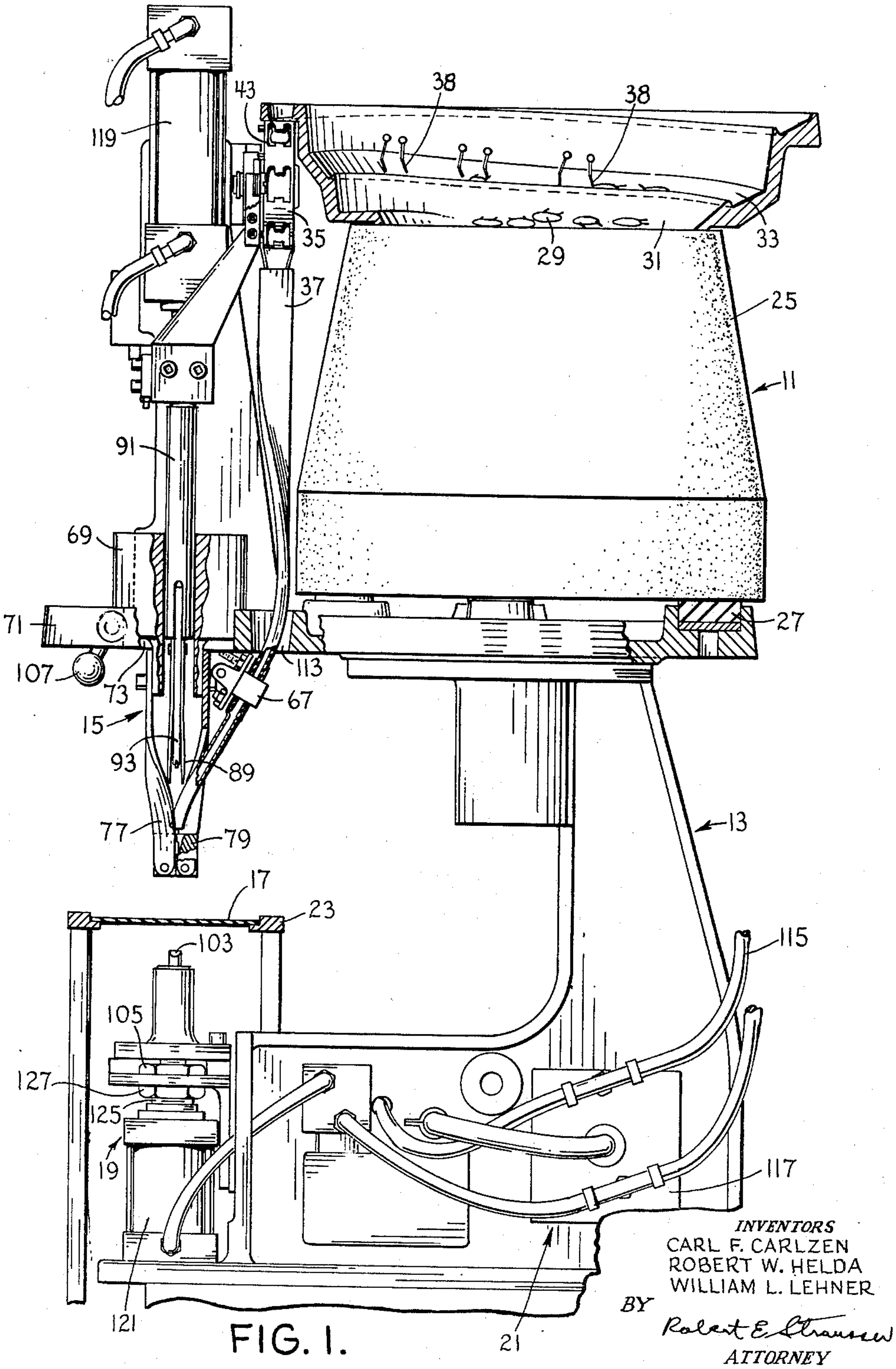
FIG. 1 is a partially sectioned plan view of a component assembly apparatus.
Figure 2:
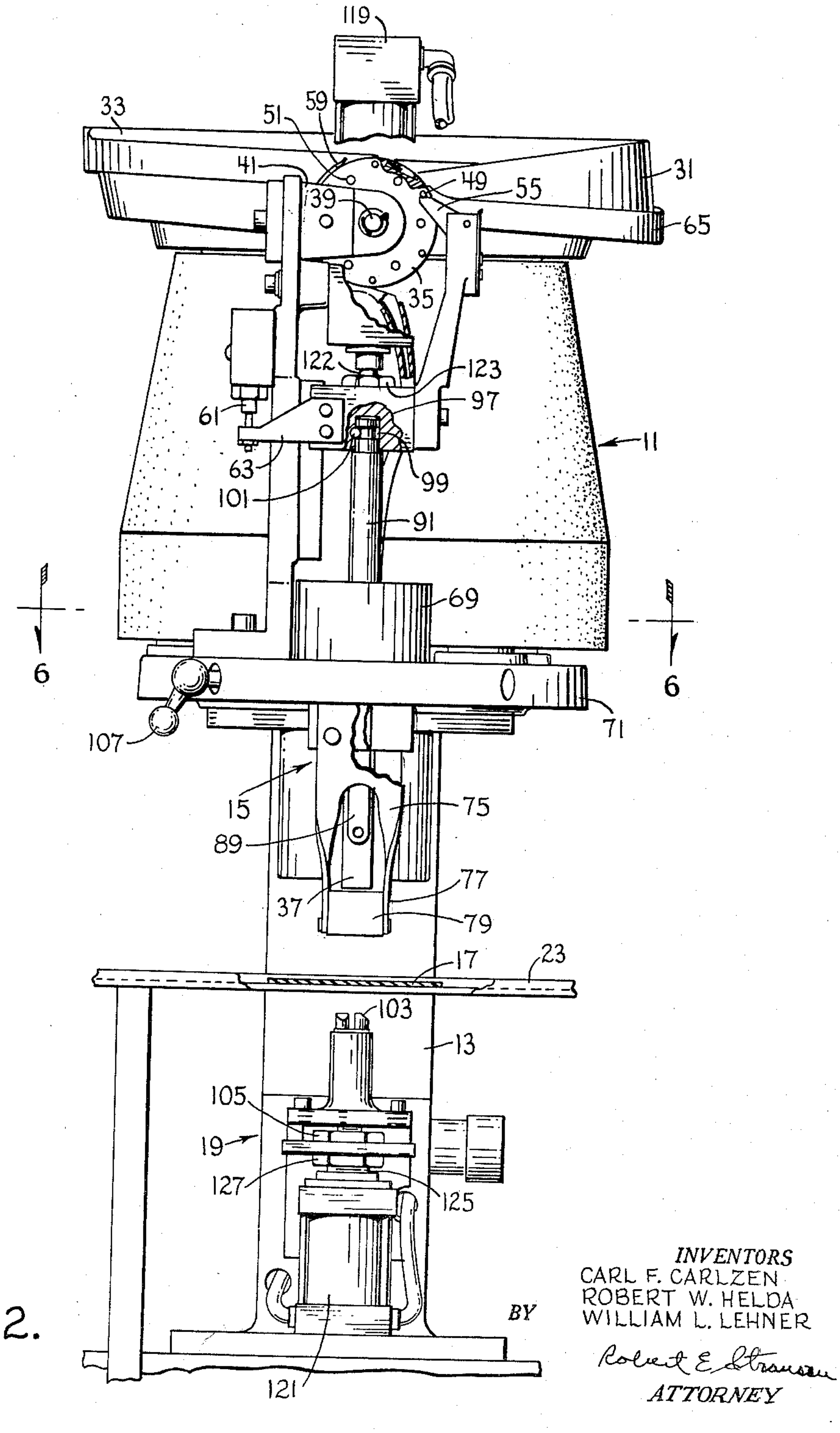
FIG. 2 is a partially sectioned end view of the assembly apparatus shown in FIG. 1.

Referring to the drawings, an automatic dispenser 11 of the vibrating type is shown mounted upon the top portion of frame 13. Positioned adjacent dispensing device 11 on the frame is a component receiving and inserting head 15, which operates on electrical components deposited therein from dispenser 11 to mount the components upon chassis panel 17. This panel may be of the printed circuit type with electrical conductors mounted on the bottom surface of the insulating strip. Apertures are formed in panel 17 at the appropriate circuit positions so that the component leads may be inserted therethrough. A clinching device 19 which is mounted upon the lower portion of frame 13, moves vertically upward to bend those portions of the leads which extend through the panel apertures, and to thereby cause an electrical contact to be made between the component leads and the circuit conductors. The automatic assembly apparatus is provided with translating means 21 having electrically actuated pressure valves appropriately connected to the machine elements to actuate the proper machine movements in sequence.

The chassis panel 17 is carried along on an intermittently operating conveyor 23 which is electrically connected to the translating means 21 so that panel 17 may be stopped at the proper position beneath head 15 for a period of time sufficient to allow the component mounting operation to be performed. A conveyor adapted to operate in a production line having machines of the type illustrated in the drawings is shown and described in copending application S.N. 454,964, filed September 9, 1954, now Patent No. 2,873,513, entitled "Automatic Assembly Apparatus," and assigned to the same assignee as the present invention. A master timing device (not shown) may be employed with the conveyor and translating means 21 so that the assembly apparatus and conveyor movements relative to one another will occur in the proper sequence.

Dispensing device 11 has a housing 25 within which is affixed a conventional electrically actuated vibrator. The dispenser is mounted upon frame 13 by means of supports 27 disposed about the periphery thereof. When dispenser 11 is caused to vibrate, the electrical components 29 move from the bottom of bowl 31 upwardly along spiral track 33 to eventually reach the dispensing wheel 35. Components 29 are shown as capacitors having a disc-like body portion with lead wires extending laterally therefrom. In order to properly align the components so that they will reach wheel 35 with the leads trailing, a number of spaced arrestors 38 are mounted along track 33. These arrestors are mounted upon the walls of bowl 31 and are formed as wire members extending into or along the path of component travel. If a component 29 approaches an arrestor 38 with the leads directed forwardly or sidewise, these leads will come into contact with the arrestors and the component will be rotated until the leads are trailing, at which time it will be free to continue along the track.

Components 29 are transferred from bowl 31 to wheel 35 and thence to chute 37, which directs the components dispensed therein to head 15 where it is operated on in a manner to be hereinafter described.

Dispenser wheel 35 is mounted upon a shaft 39, which is attached to frame brace 41. The wheel is provided with depressions 43 formed in the peripheral surface thereof. These depressions have a configuration generally conforming to the profile and contours of the component body as illustrated clearly in FIGS. 3 to 5 inclusive. Curved portions 45 in depressions 43 allow acceptance of the leads, while a ledge 47 is formed to extend upwardly from the depression so that it may hold one component in position.

Wheel 35 is also provided with pins 49 and recesses 51 arranged about side plate 53. A ratchet 55 mounted upon a reciprocating member of head 15 to be hereafter described contacts one of the pins with each upward movement and thereby causes wheel 35 to rotate a sufficient distance to expose an unloaded depression 43 and to dispense a component from the lower most loaded depression into chute 37. After each ratchet movement of the wheel, the spring loaded element 57, which is extending through brace 41, protrudes into a recess 51 to yieldably lock the wheel at that position.

A wheel cover 59 is disposed adjacent that section of wheel 35 which is intermediate the wheel component loading and releasing positions. This wheel cover is closely spaced from the periphery of the wheel so that the components 29 lying in depressions 43 are confined by the depression configuration and the cover. Therefore, the components cannot drop from the wheel or slip down chute 37 until they reach the proper position near the end of the radial portion of cover 59.

Dispenser 11 causes components 29 to move along the spiral track 33 during that portion of the apparatus operative cycle when head 15 is at the retracted or upward position. The electrical circuit providing the vibration for dispenser 11 is energized when switch 61 is depressed by arm 63. At this time, the switch also relays a pulse to the conveyor system to signal machine readiness for conveyor movement. The wheel 35 is always assured of receiving a component in the empty depression 43 disposed adjacent the end of track 33 since the velocity of travel of the components up the track causes a plurality of these components to move through this position for each operation of the dispenser. However, the depression will only accept one component, and the remainder will slide over the top of the retained component and return to bowl 31 by means of outside track 65. An inlet is provided in the bowl wall to allow these excess components to return.

A pivotally mounted chute support 67 is attached to head 15 so that chute 37, which is made of flexible material, may be displaced from portions of the head 15 during its downward movement as will be hereafter described.

The non-reciprocating portions of component assembly head 15 are attached to frame 13 by means of rotatably mounted block 69. A frame collar 71 is formed with a ledge 73 upon which the bottom surface of block 69 rests. Two springs 75 are mounted on opposite sides of the lower section of block 69. These springs are formed with tongs 77 which straddle and support two pivotally mounted sections of split chuck 79 by means of pins 81. The tongs are stiff but sufficiently flexible to yield under the proper pressure and sufficiently resilient to maintain a force which normally presses the two split chuck sections together. The cutout portion 83 intermediate tongs 77 allows flexible chute 37 to extend therethrough so that components 29 may be directed to the central portion of split chuck 79.

Figure 7:
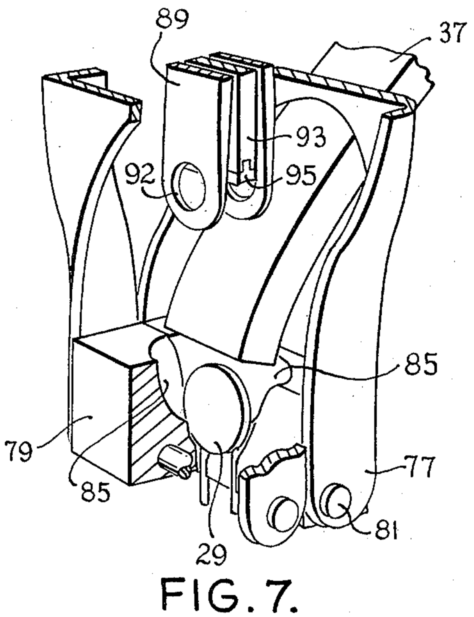
FIGS. 7 and 8 illustrate the manner in which the component is grasped and the component leads are formed during the machine operation.
Figure 8:
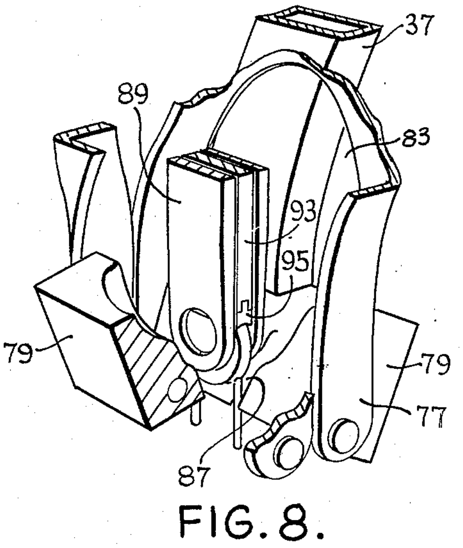

Referring to FIGS. 7 and 8, it can be seen that the opposed faces 85 of split chuck 79 are formed with a tapering recess terminating in grooves 87 through which the leads of component 29 are forced to move. The form and pivoting action of faces 85 cause the component and its leads to be properly positioned and aligned relative to the apertures in panel 17 while the component is traveling through split chuck 79 as will be hereafter described.

The vertically reciprocating elements of head 15 include a component transfer device in the form of clamping jaws 89 which are mounted within the lower part of shaft 91. These jaws are formed from resilient material normally biased to assume a spaced apart relationship. Apertures 92 are formed in each jaw to aid in the accommodation of the body contour of components 29. Disposed intermediate jaws 89 and attached thereto is a leaf 93 terminating in a soft pad 95. Since the disc-like body portion of component 29 is generally made of ceramic material, pad 95 serves to cushion and protect the top surface of the component while it is being assembled upon panel 17. The jaws are made of thin material and have a lateral dimension substantially equal to the diameter of the component so that an assembly operation may be performed in a panel area restricted by previously mounted adjoining components.

Positioned on the upper portion of reciprocating shaft 91 is a support member 97, which has an aperture 99 for receiving the end of the shaft. A depression is formed on the wall of the aperture to accommodate pin 101. The shaft has an indentation formed to engage the pin and thereby provide means for rotatably mounting the shaft upon support member 97. Ratchet 55 and switch arm 63 are externally mounted upon the reciprocating support member to operate on wheel 35 and switch 61 as previously described. A slot 102 is formed in support member 97 for cooperation with a track 104 integrally associated with bracket 105 to provide a guide path for the reciprocating movement.

Mounted upon frame 13 beneath panel 17 and clamping jaws 89 is the vertically reciprocating clinching device 19. The head of this device is provided with formers 103 which bend the component leads after they have been inserted through the panel to cause a connection to be made with the panel conductors.

Figure 6:
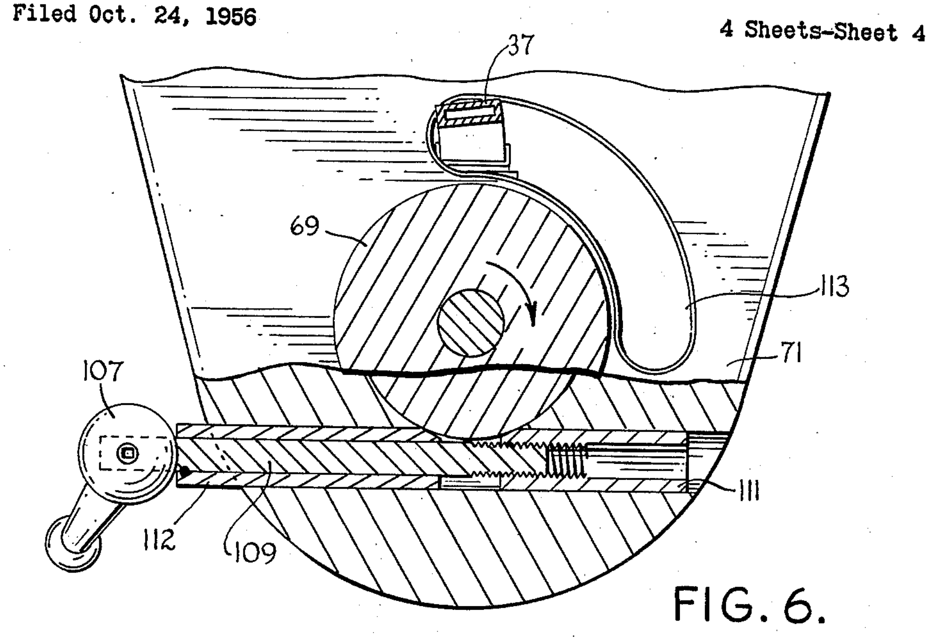
FIG. 6 is a view taken along line 6—6 of FIG. 2.

Since it is very often advantageous to mount electrical components along differently oriented axes relative to a given panel axis, the reciprocating parts of the assembly apparatus are provided with means for providing orientation versatility. The head portion of clincher 19 may be easily rotated after adjustment of nut 105 while manipulation of handle 107 loosens certain ones of the reciprocating parts of head 15 so that they may also be rotated. Referring to FIG. 6, the handle is attached to a shaft 109 formed to threadably engage a slidable sleeve 111 positioned within an opening in collar 71. The shaft extends through a stationary sleeve 112. After proper rotational orientation of block 69 and shaft 91, the handle is turned to cause the tapered ends of these sleeves to abut and bind the lower portion of block 69. As long as the block is maintained at its proper position, clamping jaws 89 will also be properly positioned since the opposed faces 85 in split chuck 79 will align them as they press therethrough. Collar 71 is also provided with an opening 113 of approximately 90° to accommodate the different locations of flexible chute 37 when clamping jaws 89 are rotated to different positions.

Translating means 21 operates electrically in conjunction with conveyor 23 to assure a proper sequence of machine movements after panel 17 has assumed its position and stopped beneath chuck 79. Air pressure is supplied to the translator through tubes 115, and is controlled by means of electrically operated valves 117. This presure acts in sequence upon head cylinder or actuator 119 and clincher cylinder or actuator 121 to cause the electrical component leads to be first inserted into the panel apertures and then clinched The rod 122 of cylinder 119 is attached to support member 97 by means of nut 123 while rod 125 of cylinder 121 is attached to the head of clincher 19 by means of nut 127. Adjustment of nut 123 provides a means for raising or lowering the distance of travel of jaws 89 to accommodate different sizes of components. Ratchet 55 may also be adjusted in accordance with the requirements necessitated by component size. The cylinder 119 is mounted upon bracket 105 by means of bolts cooperating with openings 129.

Figure 5:
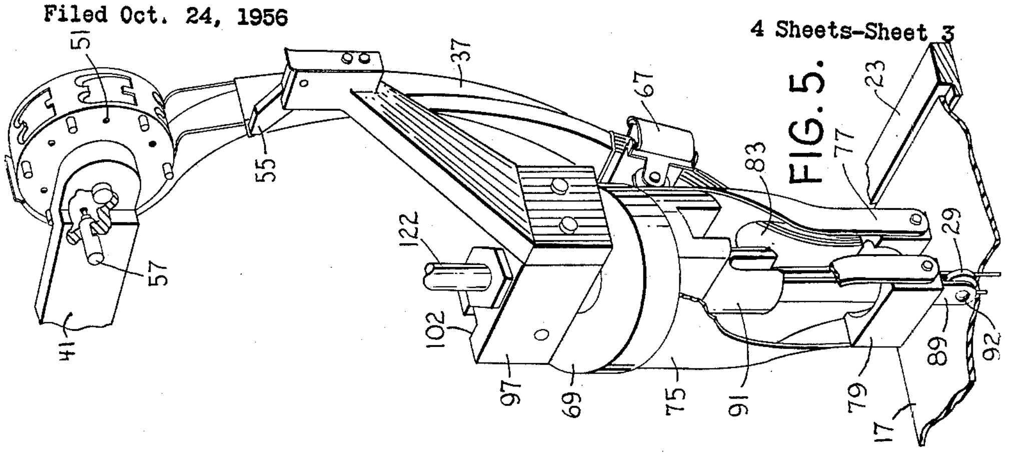
FIGS. 3, 4 and 5 illustrate the movements of certain portions of the apparatus during the handling of electrical components.
Figure 4:
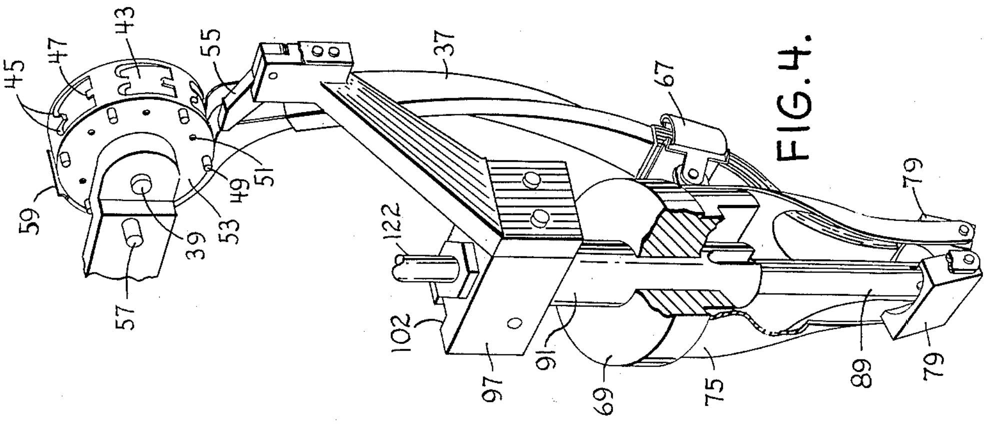
Figure 3:
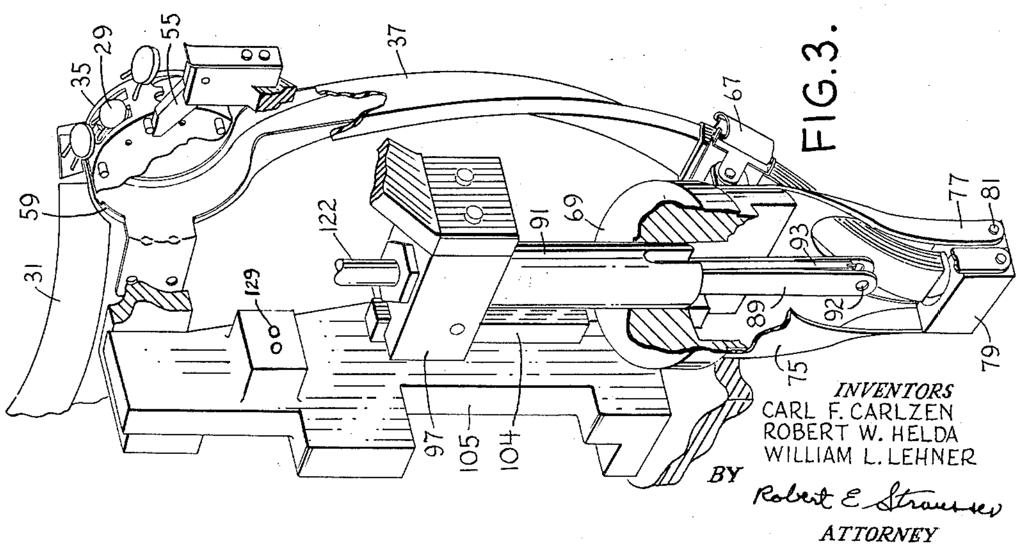

The assembly apparatus described herein automatically dispenses and mounts electrical components upon an electrical chassis panel. When the vertically reciprocating parts of the machine are in retracted position, as shown in FIG. 3, dispenser 11 is being kept in an operative condition by means of depressed switch 61 and is thereby delivering components 29 through the discharge portion of bowl 31 and into the loading position of conveyance device or wheel 35. At this time, a component is nesting within the faces 85 of split chuck 79 as shown in FIG. 7. After conveyor 23 has positioned a panel 17 beneath the chuck, the timing mechanism (not shown) in the production line signals translator 21 to begin supplying air pressure to the appropriate valves 117. Through these valves the air pressure is directed to cylinder 119, which causes support member 97 and attached shaft 91 to move downwardly. At the offset of this movement, switch 61 is opened and dispenser 11 ceases to vibrate. The spaced apart clamping jaws 89 attached to the shaft first come into contact with the pivotally mounted chute 37 and force it from the path of travel. Continued downward movement causes the jaws to straddle the component body until it touches pad 95 and then grasp it firmly as they contact tapered faces 85, which operate to cam the jaws inwardly. During this compression, the jaws counteract to cause the rotatably mounted sections of split chuck 79 to pivot outwardly and thereby present a narrow aligning path through which the component is forced to travel as shown in FIGS. 4 and 8. Further downward movement of jaws 89 forces the component leads to become straightened and aligned above the apertures or lead receiving portions in panel 17 by passage through grooves 87. Immediately thereafter, the compressed jaws force the sections of split chuck 79 to yieldably part and allow movement of the chuck and component to continue therethrough to the panel as shown in FIG. 5. The leading surfaces of jaws 89 operate on the lower edges of faces 85 to pivot the chuck sections back to their normal position as they pass.

After the component leads have been inserted through panel 17, air pressure is supplied to clincher cylinder 121, which causes formers 103 to move up and bend the leads over and into engagement with the chassis panel conductors. The translating means thereafter reverses the pressure in cylinders 119 and 121, and thereby causes jaws 89 and formers 103 to return to their retracted positions.

With the upward movement of support member 97, switch arm 63 engages switch 61, which signals the conveyor 23 and dispenser 11 to begin operation. Immediately prior to the operation of switch 61, the ratchet 55 contacts pin 49 and forces wheel 35 to rotate to the next position. The wheel at this time dispenses a component 29 into chute 37 and presents an open depression 43 at the mouth of track 33. Dispenser 11 is not operating during the rotational movement of the wheel. The machine elements have then assumed the respective positions shown in FIG. 3, and are in readiness for the next component assembly operation.

The apparatus illustrated herein has been described in conjunction with a disc-shaped electrical component and a conventional printed circuit type chassis panel. However, it is to be understood that this machine is adapted for assembly of various types and shapes of components upon any form of chassis panel having electrical lead receiving portions.

Although several embodiments of the invention have been shown and described, it will be apparent to those skilled in the art that various changes and modifications may be made therein without departing from the scope of the invention as defined by the appended claims.

What is claimed is:

1. An apparatus for assembling electrical components upon a chassis panel lying at a given position in a given plane and having a given longitudinal axis comprising a fixed component dispenser mounted above the panel position for supplying components in an oriented manner, said dispenser comprising a vibrating bowl having a discharge portion and a rotating wheel having a peripheral surface formed with component receiving depressions and positioned to receive the components from said discharge portion, a component assembly head having an axis of reciprocation mounted between the panel and said dispenser for axial reciprocation between an upper position whereat said components are received in an oriented manner and a lower position whereat said components are assembled upon the panel, said head being further mounted for adjustable rotative movement about said axis of reciprocation in a plane substantially parallel with the given panel plane, a flexible chute interconnecting said dispenser and said assembly head and twisting in response to the rotative movement of said head for feeding the components supplied from the dispenser to the head when said head is in the component receiving position, said flexible chute being formed and twistable to feed the components to the head in said oriented manner at any rotatively adjusted position of said head, and means for rotatively moving said head to adjust the position thereof in order to provide assembly of components along pre-selected axes relative to the given panel axis.

2. An apparatus for assembling laterally leaded electrical components upon an electrical chassis panel comprising a split chuck having opposed component retaining faces, spring means for yieldably urging said faces toward one another, and a component transfer device having component clamping jaws normally urged apart, said transfer device being movable longitudinally through said chuck whereby said jaws are compressed together by said chuck faces as the jaws move therethrough.

3. An apparatus for assembling laterally leaded electrical components upon an electrical chassis panel comprising a split chuck having opposed faces formed to receive the component, said faces being yieldably urged toward one another, a dispenser for sequentially depositing components upon said faces, a component transfer device having component clamping jaws normally urged apart, said transfer device being movable longitudinally through said chuck and between said faces whereby said jaws become compressed to grasp the component as said faces yieldingly allow movement of the jaws therethrough.

4. An apparatus for assembling laterally leaded electrical components upon an electrical chassis panel comprising a split chuck having pivotally mounted opposed faces formed to receive the component and align the component leads, said faces being yieldably urged toward one another, a dispenser for sequentially depositing components upon said faces, a component transfer device having component clamping jaws normally urged apart, and actuating means for moving said transfer device longitudinally of said chuck and between said faces, said jaws being compressed to grasp the components as said faces pivot and yieldingly allow movement of the jaws therethrough.

5. An apparatus for assembling laterally leaded electrical components upon an electrical chassis panel comprising a split chuck having pivotally mounted opposed faces formed with tapering recesses to receive the component and grooves to align the component leads relative to the panel, said faces being yieldably urged toward one another, a dispenser for sequentially depositing components upon said faces, a component transfer device having component clamping jaws normally urged apart, and actuating means for moving said transfer device longitudinally of said chuck and between said faces, said jaws being compressed to grasp the components as said faces pivot and yieldingly allow movement of the jaws therethrough.

6. An apparatus for assembling laterally leaded electrical components upon an electrical chassis panel comprising component receiving means, a dispenser for sequentially depositing components upon said receiving means, a component transfer device having component clamping jaws normally urged apart, said jaws being formed of thin resilient material having a lateral dimension substantially equal to the lateral dimension of the component, actuating means for moving said transfer device longitudinally of said receiving means and adjacent the panel, and means associated with said receiving means operating on said jaws to compress them upon said component during the longitudinal movement.

References Cited in the file of this patent

UNITED STATES PATENTS

| | | |
|---|---|---|
| 684,026 | Woodland | Oct. 8, 1901 |
| 968,863 | Mackay | Aug. 30, 1910 |
| 2,303,226 | Olson | Nov. 24, 1942 |
| 2,550,837 | MacKenzie | May 1, 1951 |
| 2,609,914 | Balsiger | Sept. 9, 1952 |
| 2,661,881 | Kasper | Dec. 8, 1953 |
| 2,662,646 | McCain | Dec. 15, 1953 |
| 2,744,601 | Chilton | May 8, 1956 |
| 2,745,571 | Roy | May 15, 1956 |
| 2,778,478 | Brook | Jan. 22, 1957 |
| 2,783,897 | Farquharson | Mar. 5, 1957 |
| 2,850,737 | Walsh | Sept. 9, 1958 |
| 2,855,113 | Roske | Oct. 7, 1958 |
| 2,894,616 | Young | July 14, 1959 |
| 2,896,213 | Alderman | July 28, 1959 |
| 2,949,665 | Bergsland | Aug. 23, 1960 |
| 2,965,247 | Hepner | Dec. 20, 1960 |